3,740,235
METHOD OF FORMING A BEEF LOAF
Philip D. Weiner, Fort Wayne, Ind., assignor to
Peter Echrich & Sons, Inc.
No Drawing. Continuation of application Ser. No.
756,422, Aug. 30, 1968. This application Aug. 13,
1970, Ser. No. 63,651
Int. Cl. A23l 1/31
U.S. Cl. 99—107　　　　　　　　　　　　　　　8 Claims

ABSTRACT OF THE DISCLOSURE

A process of forming an uncooked meat loaf that may be subsequently cooked without a "reheated" flavor and sliced including the steps of grinding large lean muscles to the size of about a half pound or less, mixing the same together with seasoning, adding an all-meat binder formed of relatively finely ground trimmings and continuing the mixing, stuffing the mix into containers such as molds or casings, and heating the stuffed containers until the internal temperature thereof is on the order of 100° F.

BACKGROUND OF THE INVENTION

In the past few years, there has been a substantial upsurge in the popularity of roast beef sandwiches. The increase in popularity has been such that commercial restauranteurs have opened establishments that deal substantially only in providing roast beef sandwiches and which are generally on the order of the various well-known chains dealing primarily in such items as hamburgers and frankfurters.

Such establishments have heretofore provided the roast beef in the conventional way, namely, obtaining the round of beef and roasting the same by any of a variety of methods. Thereafter the roast round of beef is sliced and the slices are then placed in a sandwich.

The foregoing method has several disadvantages. A typical roast round of beef is not an inexpensive cut and accordingly, the cost of providing roast beef sandwiches from roast round of beef is substantially higher than would be the case if the sandwiches could be made from less expensive meat obtained from muscles from various locations of the beef carcass. Additionally, because of the lack of uniformity in size and shape of roast rounds of beef, substantial wastage occurs and frequently cooking of the roast round of beef cannot be regulated sufficiently to provide a uniform, cooked product. That is, because of the differences in size and shape of the rounds of beef, the cooking time for each round of beef will vary and some such rounds may produce more well-done meat than other rounds.

The present invention seeks to overcome the foregoing by providing a process for forming a beef loaf in conventional loaf molds, which beef loaves may be sold to the restauranteurs for subsequent cooking, slicing and serving. The forming of the loaf in a conventional loaf mold or casing insures the size of the loaf will not vary whereby the cooking of the loaf is more easily accomplished because of the absence of such variables as size and shape. Additionally, as will be seen hereinafter, the nature of the meat used to form the loaf is such that beef trimmings of lesser cost than round of beef may be used thereby lowering the cost of the product.

Heretofore in the forming of the beef loaves, two general types of processes have been utilized. According to one such process, relatively large chunks of beef are stuffed or pressed into a container and thereafter, the container is rapidly chilled so that the contents thereof are brought below the freezing point and maintained at such a temperature for a substantial period on the order of days. This process has a major disadvantage in that the resulting product includes many voids or, if sufficient pressure is applied during the stuffing operation, the chunks of meat are stressed such that when removed from the container, they tend to restore to their original shape so that the loaf has poor binding qualities and the chunks comprising the loaf tend to separate and the loaf does not retain its integrity.

The second approach utilized again involves the stuffing of large chunks into a container and then heat processing the same until the internal temperature of the loaf is on the order of 145° F. or more. Of course, if low stuffing pressures are utilized, void spaces in the finished loaf will be present with this process also. The heat treatment is such as to coagulate the protein of the meat in the loaf thereby "setting up" the meat so that the finished loaf will retain its integrity. This method has a subsantial disadvantage in that temperatures required to coagulate the protein in the loaf to achieve acceptable binding, approach the order of cooking temperatures and as a result, when the loaf is subsequently cooked and served, it has a noticeable "reheated" flavor. Thus, loaves formed by this process are unattractive from the taste standpoint.

SUMMARY OF THE INVENTION

It is the principal object of the invention to provide a new and improved process for forming beef loaves.

More specifically, it is an object of the invention to provide a process for forming beef loaves that may be easily cooked to a desired degree of doneness throughout and wherein the loaf is such as to retain its integrity and yet, upon subsequent cooking, will not have an undesirable "reheated" flavor.

Another object is a process for forming beef loaves including the steps of grinding large lean muscles to the size of about a half pound or less, mixing the same together with seasoning, adding an all-meat binder formed of relatively finely ground trimmings and continuing the mixing, stuffing the mix into molds or casings, and heating the stuffed molds or casings until the internal temperature thereof is on the order of 100° F.

Yet another object of the invention is the provision of a beef loaf resulting from the process set forth in the preceding paragraph.

A further object is the provision of a method of preparing an uncooked beef loaf that may be subsequently cooked without a reheated flavor including the steps of dividing lean muscle to a plurality of chunks having a maximum weight on the order of about one-half pound providing a relatively finely divided binder comprised of finely ground beef and/or non-beef protein material, mixing the chunks and salt and water thereafter, mixing the binder with the muscle chunks, stuffing the mixture into containers, heating the containers until the internal temperature of the latter is in the range of about 80–120° F.

A still further object is the provision of a method such as that set forth in the preceding paragraph wherein the step of heating is followed by rapidly chilling the mixture in the containers until the internal temperature thereof is no higher than about 40° F.

Another object is the provision of a method such as that set forth above wherein the step of heating is accomplished by subjecting the stuffed containers to a temperature that is less than 175° F.

Still another object is the provision of a method such as that set forth above wherein the muscle chunks comprise about 55–94% by weight of the formulation, the binder comprises about 5–35% by weight of the formulation, the water comprises up to 15% of the formulation and the salt comprises at least 0.7% of the formulation.

Yet another object is the provision of a method such as that set forth in the preceding paragraph wherein the chunks comprise about 70–85% by weight, the binder comprises about 10–25% by weight, the water comprises 3–9% by weight, the salt comprises about 1% by weight and the remainder of the formulation is comprised of seasoning materials.

An additional object of the invention is the provision of a beef loaf formed by the method set forth above.

Other objects and advantages of the invention will become apparent from the following specification.

DESCRIPTION OF THE PREFERRED EMBODIMENTS

Ingredients

The principal ingredient of a beef loaf made according to the exemplary embodiment of the invention consists of large, lean trimmed muscles which may be taken from any part of a beef carcass. The muscle is coarsely ground in a conventional grinder using a four to six-inch plate (for example a plate having a plurality of pear-shaped apertures, each aperture having a long dimension of about four to six inches). While the muscle may be coarsely ground through plates having differing dimensions, it has been found that the use of a four to six inch plate results in a product having an optimum texture. If desired, the muscle can be cut to sizes corresponding to those achieved by conventional grinding.

As a result of the grind, a plurality of muscle chunks are provided with the maximum weight of an individual chunk being on the order of one-half pound with a sizable majority of the chunks having a weight substantially less than that figure. While chunks having a greater maximum weight can be employed, economic and texture considerations suggest that the upper limit of one-half pound be maintained. For example, when larger chunks are utilized, a lesser percentage of a carcass may be employed in forming a beef loaf made according to the invention. Similarly, with conventional stuffing equipment and conventional molds and casings, some difficulty may be experienced in the stuffing of chunks having a large maximum weight.

In a beef loaf made according to the exemplary embodiment of the invention, the muscle chunks comprise about 55–94% by weight of the total formulation. An optimum loaf may be formed using 70–85% by weight. Some deviation from the limits of the foregoing range may be tolerated if the quality of loaf integrity can be sacrificed.

A second ingredient comprises a relatively finely divided binder and forms about 5–35% by weight of the total formulation in the exemplary embodiment with the optimum amount being about 10–25% by weight of the total formulation. The binder may be formed primarily or entirely of meat and preferably comprises inexpensive cuts as shank meat and trimmings although any part of the carcass may be used. The binder is obtained by first grinding the same in a conventional grinder through a one-fourth inch plate and thereafter regrinding the binder through a 3/32 inch plate. If desired, only the last mentioned grind may be made.

While the use of an all-meat binder represents a preferred form of the invention, a portion of the binder may be replaced by non-meat protein sources. For example, 2 or 3% of the total formulation of dry, non-fat milk powder could be substituted for a corresponding portion of the meat used in the binder.

The binder enhances the bind achieved between the coarsely ground muscle chunks to maximize loaf integrity and further insures that the finished loaf will not include voids even when low stuffing pressures are used.

Additional ingredients consist essentially of seasoning and water. In the exemplary embodiment, the total formulation includes about 1% salt. The lower limit of salt addition is about 0.7% by weight while the upper limit may be essentially determined by the degree of saltiness desired in the finished product. In most cases, it is not desirable to exceed approximately 2% salt by weight in the finished product. Water is utilized in the range from about 0 to 15% of the total formulation with about 3–9% water providing best results. Water addition to the extent of 3% is most desirable in view of government regulations concerning the labeling of the finished product.

Approximately 0.3% monosodium glutamate is also included in the formulation to enhance the beef flavor. However, the addition of monosodium glutamate is not at all critical and may be eliminated if desired.

Other optional ingredients include various phosphate compounds known in the art. Such phosphates tend to aid in the extraction of protein for binding purposes and further tend to restore the meat in the finished product to a condition approaching the immediate post mortem condition of the meat.

Finally, other seasoning ingredients as may be desired may be added. For example, a smoked flavor, pepper, or beef extract may be utilized if desired.

Physical processing

Certain of the ingredients are subjected to an initial mixing step. Specifically, the muscle chunks together with the salt, monosodium glutamate, phosphates if desired and such other seasoning ingredients as may be desirable are placed in a conventional mixer along with all or part of the water to be added. While the addition of monosodium glutamate and phosphate at this time is not necessary, it has been found to be highly desirable to include the salt at this point in the process.

Water addition may be accomplished either by adding the requisite amount of liquid water or by adding ice. Of the two alternatives, it has been found preferable to add the water in the form of ice in that the lower temperature of the resulting mix practically eliminates all evirence of fat separation.

The muscle chunks, salt and water and such other ingredients as may have been added at this time are then mixed for a time period having a lower limit of about two minutes and an optimum mixing time of about four minutes.

Upon conclusion of the initial mix, the binder and such other ingredients as have not yet been added are added to the mixer. Thereupon, the entire formulation is mixed for a time period in the range of one to five minutes with the optimum time being on the order of two to four minutes.

The ingredients are then subjected to a vacuum to remove entrained air and to reduce the possibility of voids. While any conventional evacuation process may be used, it has been found satisfactory to apply the vacuum to the ingredients while they remain in the mixer. Specifically, a vacuum of about 25 inches of mercury is applied to the mixer and the mixer is cycled three times through an "On" period of 15 seconds followed by an "Off" period of 15 seconds.

While the preferred form of the invention includes the step of evacuating the ingredients, it has been found that a satisfactory product may be obtained without the application of a vacuum.

Following evacuation, the ingredients are then placed in a conventional stuffer and pressure stuffed into containers such as molds or casings. When loaf molds are used, it has been found acceptable to use a 4 x 4 x 18 inch mold which may be held against the stuffing horn while the ingredients are applied to the interior of the mold with some pressure being manually exerted against the end of the mold to hold the same as close as possible to the suffing horn.

When the product is stuffed into casings, any conventional stuffing process may be used.

It is to be noted that the ingredients may be stuffed into containers at very low pressure. However, it has een found that higher stuffing pressures result in a more desirale finished product.

Upon the completion of the stuffing of the mold, the same is closed and placed in any suitale oven for heat treatment. The loaf containing molds are heated for a sufficient period of time so that the internal temperature of the loaf within the molds is brought within the range of 80–120° F. with the optimum internal temperature being on the order of 100° F. At internal temperatures lower than 80° F. a satisfactory bind cannot be achieved while at internal temperatures in excess of 120° F., upon subsequent cooking, a "reheated" flavor becomes evident.

Preferably, the heat treatment of the product is accomplished by placing the stuffed molds in a conventional steam oven at 140° F. for approximately one and one-half hours. However, a dry oven operated at a temperature in the range of 150°–170° F. may be used, in which case, it is necessary to increase the residence time to something on the order of two and one-half hours.

No matter which form of heat treatment is used, it is desirable that the oven temperature be relatively low. It has been found that when relatively high oven temperatures are used (for example 175° F., or more) the surface of the loaf will be an undesirable appearance if the heating time is such as to bring the internal temperature of the loaf into the desired 80–120° F. range. Thus, high temperature oven treatment is to be avoided.

Upon completion of the heat treating step, the product is rapidly chilled, preferably by any conventional air blast process. Because the heating temperatures utilized are insufficient to kill bacteria and, in fact, are ideal for encouraging the growth of many forms of bacteria, it is highly desirable to instigate chilling as soon as possible. At most, no more than four to six hours should elapse before chilling is initiated and it is highly desirable to initiate chilling well in advance of such a time.

In the course of chilling the product, it is highly desirable to chill the product to a temperature of 40° F. or less as rapidly as possible to inhibit the growth of bacteria. Thereafter, the temperature of the finished loaves may be lowered further to any desired temperature, normally about 0° F., to freeze the same.

The chilling of the loaves may be performed with the loaves either in or out of the molds or casings in which they were stuffed.

Thereafter, the loaves may be packaged in any suitable manner for subsequent distribution in a frozen state to purchasers thereof.

It will be appreciated that the foregoing embodiment of the invention involves two mixing steps; namely, the mixing of the chunks with salt followed by the mixing of the mixed chunks and salt with the binder. As an alternative to the use of two separate mixing steps, all of the ingredients may be mixed simultaneously when any of several phosphate compounds known in the art included in their usual concentration.

The resulting product

The beef loaf formed by the foregoing is, in essence, an all-meat product (with the exception of the seasoning and a small amount of non-meat protein source, if used) and has an integrity, even when siliced thin before cooking, heretofore thought impossible with the minimal heat treating and low pressure stuffing outlined previously. The loaf is essentially free of voids and the large chunks of coarsely ground meat are not stressed to the point where they tend to separate. Because of the low internal temperature of the loaf at the termination of the heat treating process upon subsequent cooking of a beef loaf made according to the process, no so-called "reheated" flavor will be apparent to the consumer.

The finished loaf prior to cooking is cherry red throughout and does not bleed. Overall yield of the process is about 98% (and may approach 100%) which those skilled in the art will recognize as being substantially greater than that normally obtainable in loaf type products formed of ground meat.

Because the loaves may be formed in molds or casings having uniform cross sections, the size of each loaf will not vary and the uniform shape thereof lends itself quite readily to cooking with a high degree of predictability. Of course, if desired, the loaves may be formed in molds or casings having non-uniform shapes if desired.

Furthermore, the purchaser of loaves can be assured of uniform quality and because of the fact that the loaves can be formed in sizes significantly smaller than the size of an average round of beef, there is less likelihood of a commercial establishment cooking up a greater amount of beef than demand requires. By the same token, the individual loaves can be cooked to varying degrees of doneness with one loaf being, for example, almost completely rare and the other being almost completely well done, a feat virtually impossible with rounds of beef.

Of additional importance is that through the addition of salt and seasoning during the loaf forming process, a beef flavor that may be distinct and/or uniform from loaf to loaf is possible.

Because of the fact that the loaves may be made of uniform size, restauranteurs can easily form slices of a uniform size.

Finally, the nature of the process is such that the product, when cooked properly, is more moist than a regular round of beef and the same has uniform texture and chewing qualities.

Having described a specific embodiment of my invention as required by 35 U.S.C. 112, I do not wish to be limited to the precise details set forth, but rather, have my invention construed broadly according to the following claims.

I claim:

1. The method of preparing an uncooked beef loaf which may be subsequently cooked without a reheated flavor comprising:
    (a) dividing large, lean, uncooked beef muscle into a plurality of chunks;
    (b) providing a relatively finely divided binder formed primarily of uncooked beef;
    (c) mixing the chunks and binder with salt;
    (d) stuffing the mixture resulting from step (c) into containers;
    (e) placing the stuffed containers in an oven;
    (f) heating the containers in the oven until the internal temperature of the material therein is about 100° F. to cause the material contained therein to form a loaf; and
    (g) within about six hours thereafter, chilling the loaf; said chunks comprising about 70–80°% by weight of the formulation; said binder comprising about 10–25% by weight of the formulation; water comprising about 3–9% of the formulation; said salt comprising about 1% of the formulation; and the remainder of the formulation consisting of seasoning and/or additional binder.

2. A method of preparing an uncooked beef loaf which may be subsequently cooked without a reheated flavor comprising the steps of:
    (a) dividing large, lean, uncooked beef muscle into a plurality of chunks having a maximum weight on the order of about one-half pound;
    (b) providing a relatively finely divided binder of a material selected from the group consisting of relatively finely ground, uncooked beef and a mixture of relatively finely ground uncooked beef and finely divided non-beef protein material;
    (c) mixing the chunks and the binder with salt and water for at least about two minutes;
    (d) stuffing the mixture resulting from step (c) into containers;
    (e) placing the stuffed containers in an oven of at least 140° F.;
    (f) heating the containers in the oven until the internal temperature of the mixture contained therein is in the range of about 80–120° F.; and (g) upon the completion of step (f) rapidly chilling the loaf until the internal temperature thereof is no higher than about 40° F., said chunks comprising 55–94% by weight of the formulation and said binder comprising about 5–35% by weight of the formulation.

3. The method of claim 2 wherein the temperature of the oven is less than 175° F.

4. A method of preparing an uncooked beef loaf which may be subsequently cooked without a reheated flavor comprising the steps of:
  (a) dividing large, lean beef muscle into a plurality of chunks having a maximum weight on the order of about one-half pound;
  (b) providing a relatively finely divided binder of a material selected from the group consisting of relatively finely ground beef and a mixture of finely ground and finely divided non-beef protein material;
  (c) mixing the chunks and the binder with salt and water for at least about two minutes;
  (d) stuffing the mixture resulting from step (c) into containers;
  (e) heating the containers until the internal temperature of the mixture contained therein is about 100° F. by subjecting the stuffed containers to a temperature in excess of the desired internal temperature and less than 175° F.; and
  (f) upon completion of step (e) rapidly chilling the loaf until the internal temperature thereof is no higher than about 40° F.;
said chunks comprising about 55–94% by weight of the formulation and said binder comprising about 5–35% by weight of the formulation.

5. The method of preparing an uncooked beef loaf which may be subsequently cooked without a reheated flavor comprising:
  (a) dividing large, lean beef muscle into a plurality of chunks;
  (b) providing a relatively finely divided binder formed primarily of beef;
  (c) mixing the chunks and binder with salt;
  (d) stuffing the mixture resulting from step (c) into containers;
  (e) heating the containers until the internal temperature of the material therein is in the range of about 80–120° F. to cause the material contained therein to form a loaf by subjecting the containers to an atmosphere having a temperature of at least about 140° F.; and
  (f) within about six hours thereafter chilling the loaf; said chunks comprising about 55–94% by weight of the formulation, said binder comprising about 5–35% by weight of the formulation, water comprising about 0–15% of the formulation and the salt comprising at least 0.7% of the formulation.

6. The method of preparing an uncooked beef loaf which may be subsequently cooked without a reheated flavor comprising:
  (a) dividing large, lean, uncooked beef muscle into a plurality of chunks;
  (b) providing a relatively finely divided binder formed primarily of uncooked beef;
  (c) mixing the chunks and binder with salt;
  (d) stuffing the mixture resulting from step (c) into containers;
  (e) placing the stuffed containers in an oven atmosphere of at least about 140° F.;
  (f) heating the containers in the atmosphere so that the material contained in the containers reaches an internal temperature in the range of about 80–120° F. to cause the material contained therein to form a loaf; and
  (g) within about six hours thereafter, chilling the loaf; said chunks comprising about 55–94% by weight of the formulation, said binder comprising about 5–35% by weight of the formulation, water comprising about 0–15% of the formualtion and the salt comprising at least 0.7% of the formulation.

7. The method of claim 6, wherein step (f) is performed before the internal temperature of the material within the container exceeds about 100° F.

8. A method of forming an uncooked beef product comprising the steps of:
  (a) providing a product formulation by mixing about 55–94% by weight of the formulation of uncooked beef muscle chunks with a binder selected from the group consisting of uncooked meat and a mixture of uncooked meat and non-meat protein material, said binder comprising about 5–35% by weight of the formulation;
  (b) stuffing the formulation into a container;
  (c) heating the container in an atmosphere of at least about 140° F. until the internal temperature of the mixture therein is in the range from about 80° F. to about 120° F.; and
  (d) thereafter, chilling the product.

References Cited

UNITED STATES PATENTS 3,573,062   3/1971   Paynter et al. _____ 99—107

A. LOUIS MONACELL, Primary Examiner

R. M. ELLIOTT, Assistant Examiner

U.S. Cl. X.R.

99—107